US012561680B2

(12) United States Patent
Henry et al.

(10) Patent No.: US 12,561,680 B2
(45) Date of Patent: Feb. 24, 2026

(54) CONFIGURATION-BASED REAL-TIME NOTIFICATIONS IN TRANSACTION SYSTEMS

(71) Applicant: Truist Bank, Charlotte, NC (US)

(72) Inventors: Kendra Henry, Charlotte, NC (US); Luana Peterman, Lancaster, SC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/107,828

(22) Filed: Feb. 9, 2023

(65) Prior Publication Data

US 2024/0273523 A1    Aug. 15, 2024

(51) Int. Cl.
*G06Q 20/38* (2012.01)
(52) U.S. Cl.
CPC ......... *G06Q 20/389* (2013.01); *G06Q 20/386* (2020.05)
(58) Field of Classification Search
None
See application file for complete search history.

(56) References Cited

U.S. PATENT DOCUMENTS

| | | | | |
|---|---|---|---|---|
| 2010/0274866 A1* | 10/2010 | Hammad | ............... | G06Q 40/12 |
| | | | | 709/207 |
| 2012/0109749 A1* | 5/2012 | Subramanian | ..... | G06Q 30/0255 |
| | | | | 705/26.43 |
| 2015/0206144 A1* | 7/2015 | Kurian | ................. | G06Q 20/401 |
| | | | | 705/44 |
| 2016/0371689 A1* | 12/2016 | Brown | ................. | G06Q 20/384 |

* cited by examiner

*Primary Examiner* — Joseph W. King
*Assistant Examiner* — Liz P Nguyen
(74) *Attorney, Agent, or Firm* — Kilpatrick Townsend & Stockton LLP; Michael A. Springs, Esq.

(57) ABSTRACT

A system that can, using reduced memory resources, receive by a transaction channel monitoring layer, an alert issued by a server application of a server associated with a transaction channel of a transaction system regarding a problem associated with the transaction channel, and subsequently retrieve, by a real-time notification layer, the alert received by the transaction channel monitoring layer. The system can use information contained in the alert, such as for example, an identification of the transaction channel associated with the alert, an alert type, and an alert severity, to automatically determine a form of a notification to be generated, the content of the notification, and at least one recipient of the notification. The system can then automatically generate the notification, and automatically transmit the notification in real-time to the at least one recipient of the notification.

20 Claims, 4 Drawing Sheets

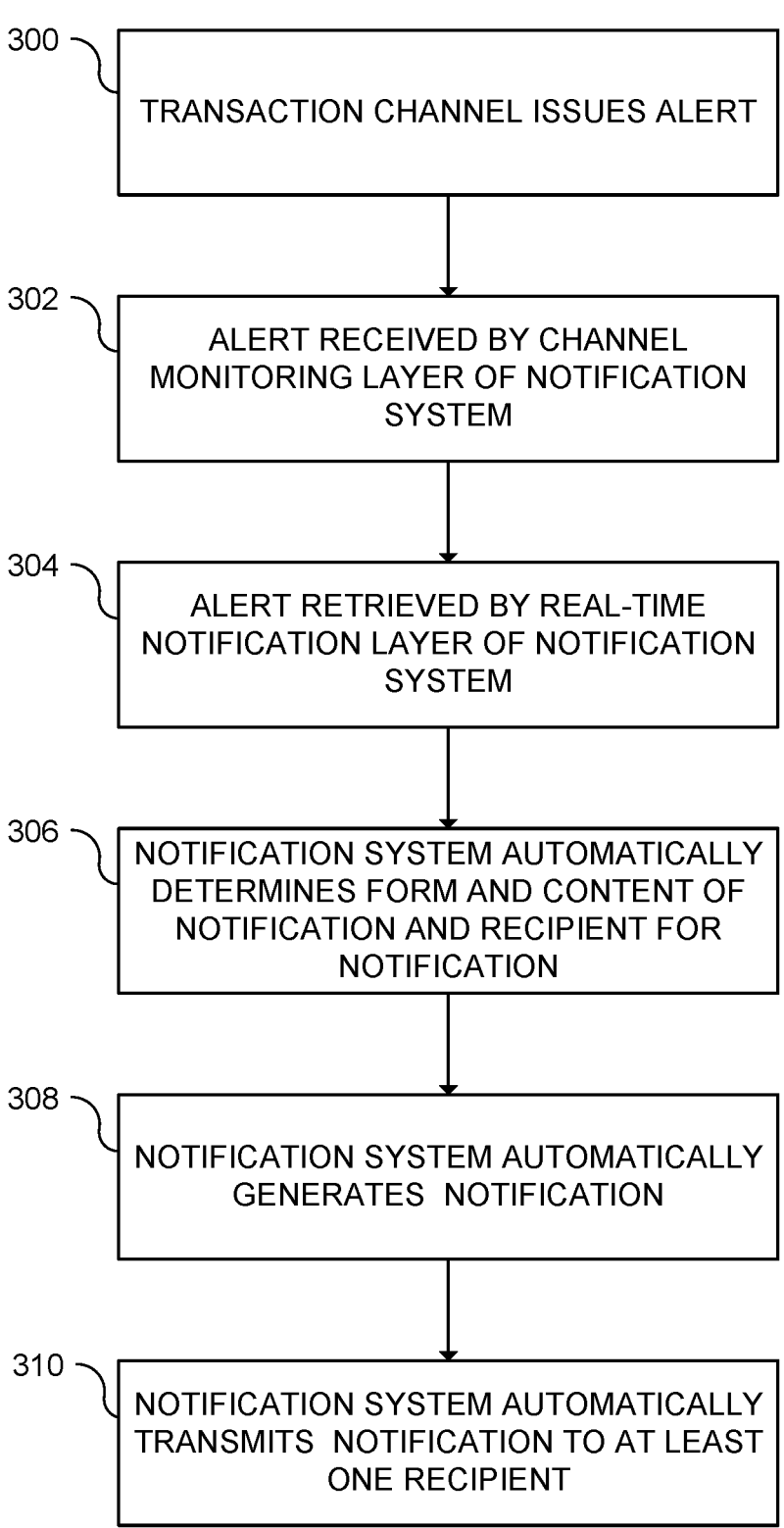

300 — TRANSACTION CHANNEL ISSUES ALERT

302 — ALERT RECEIVED BY CHANNEL MONITORING LAYER OF NOTIFICATION SYSTEM

304 — ALERT RETRIEVED BY REAL-TIME NOTIFICATION LAYER OF NOTIFICATION SYSTEM

306 — NOTIFICATION SYSTEM AUTOMATICALLY DETERMINES FORM AND CONTENT OF NOTIFICATION AND RECIPIENT FOR NOTIFICATION

308 — NOTIFICATION SYSTEM AUTOMATICALLY GENERATES  NOTIFICATION

310 — NOTIFICATION SYSTEM AUTOMATICALLY TRANSMITS  NOTIFICATION TO AT LEAST ONE RECIPIENT

FIG. 4

CONFIGURATION-BASED REAL-TIME NOTIFICATIONS IN TRANSACTION SYSTEMS

TECHNICAL FIELD

The present disclosure relates generally to real-time monitoring and alerting, and more particularly, although not exclusively, to automatic and real-time alerting of problems associated with electronic transaction channels.

BACKGROUND

Electronic transactions associated with a given entity may take place across multiple transaction channels. These transaction channels may be monitored so as to detect problems related to transmission or processing of electronic transactions associated therewith. In at least some circumstances, it is desirable to indicate a problem associated with a transaction channel and to remediate the problem as quickly as possible. Likewise, it is desirable to ensure that a party to which a problem is indicated is an appropriate party according to the nature of the problem and the transaction channel where the problem occurred.

Because multiple channel electronic transaction systems may monitor a large volume of transactions, the process of identifying, indicating and remediating problems associated with given transaction channels is commonly tedious and slow, and can consume significant memory and other resources. For example, a typical process of identifying, indicating and remediating problems associated with given transaction channels can involve writing information associated with each problem to a log, which a user must then subsequently access in an attempt to identify each problem and to determine what party or parties should be notified relative to each problem. Identification and notification of transaction channel problems on a problem-by-problem basis is not only time-consuming, but also requires significant memory resources to store all the information regarding a potential multitude of problems that may occur across the multiple transaction channels.

SUMMARY

According to one example of the present disclosure, a system may include a database, a processor communicatively coupled to the database, and memory that is communicatively coupled to the processor and includes instructions that are executable by the processor to cause the processor to perform operations. The operations may include receiving, by a transaction channel monitoring layer, an alert from a server application of a server associated with a transaction channel of a plurality of transaction channels of a transaction system, the alert regarding a problem associated with the transaction channel and containing information including an identification of the transaction channel that issued the alert, an alert type, and an alert severity. The operations may also include retrieving, by a real-time notification layer, the alert received by the transaction channel monitoring layer, and determining from the information contained in the alert retrieved by the real-time notification layer, a form of a notification to be generated, a content of the notification, and at least one recipient of the notification. The operations may additionally include generating, by the real-time notification layer, the notification, and transmitting, by the real-time notification layer, the notification in real time to the at least one recipient of the notification.

According to another example of the present disclosure, a non-transitory computer readable medium may contain instructions that are executable by a processor to cause the processor to perform operations. The operations may include receiving, by a transaction channel monitoring layer, an alert from a server application of a server associated with a transaction channel of a plurality of transaction channels of a transaction system, the alert regarding a problem associated with the transaction channel and containing information including an identification of the transaction channel that issued the alert, an alert type, and an alert severity. The operations may also include retrieving, by a real-time notification layer, the alert received by the transaction channel monitoring layer, and determining from the information contained in the alert retrieved by the real-time notification layer, a form of a notification to be generated, a content of the notification, and at least one recipient of the notification. The operations may additionally include generating, by the real-time notification layer, the notification, and transmitting, by the real-time notification layer, the notification in real-time to the at least one recipient of the notification.

According to a further example of the present disclosure, a computer-implemented method may include receiving by a transaction channel monitoring layer, from a server application of a server associated with a transaction channel of a plurality of transaction channels of a transaction system, an alert regarding a problem associated with the transaction channel, the alert containing information including an identification of the transaction channel that issued the alert, an alert type, and an alert severity. The method may also include retrieving, by a real-time notification layer, the alert received by the transaction channel monitoring layer, and determining by the real-time notification layer, from the information contained in the alert, a form of a notification to be generated, a content of the notification, and at least one recipient of the notification. The method may additionally include generating the notification by the real-time notification layer, and transmitting the notification, by the real-time notification layer in real time, to the at least one recipient of the notification.

BRIEF DESCRIPTION OF THE DRAWINGS

FIG. 4 is a flowchart of a computerized method of notifying at least one recipient in real time about an alert issued by a transaction channel of a transaction system, according to one example of the present disclosure.

DETAILED DESCRIPTION

Figure 1:
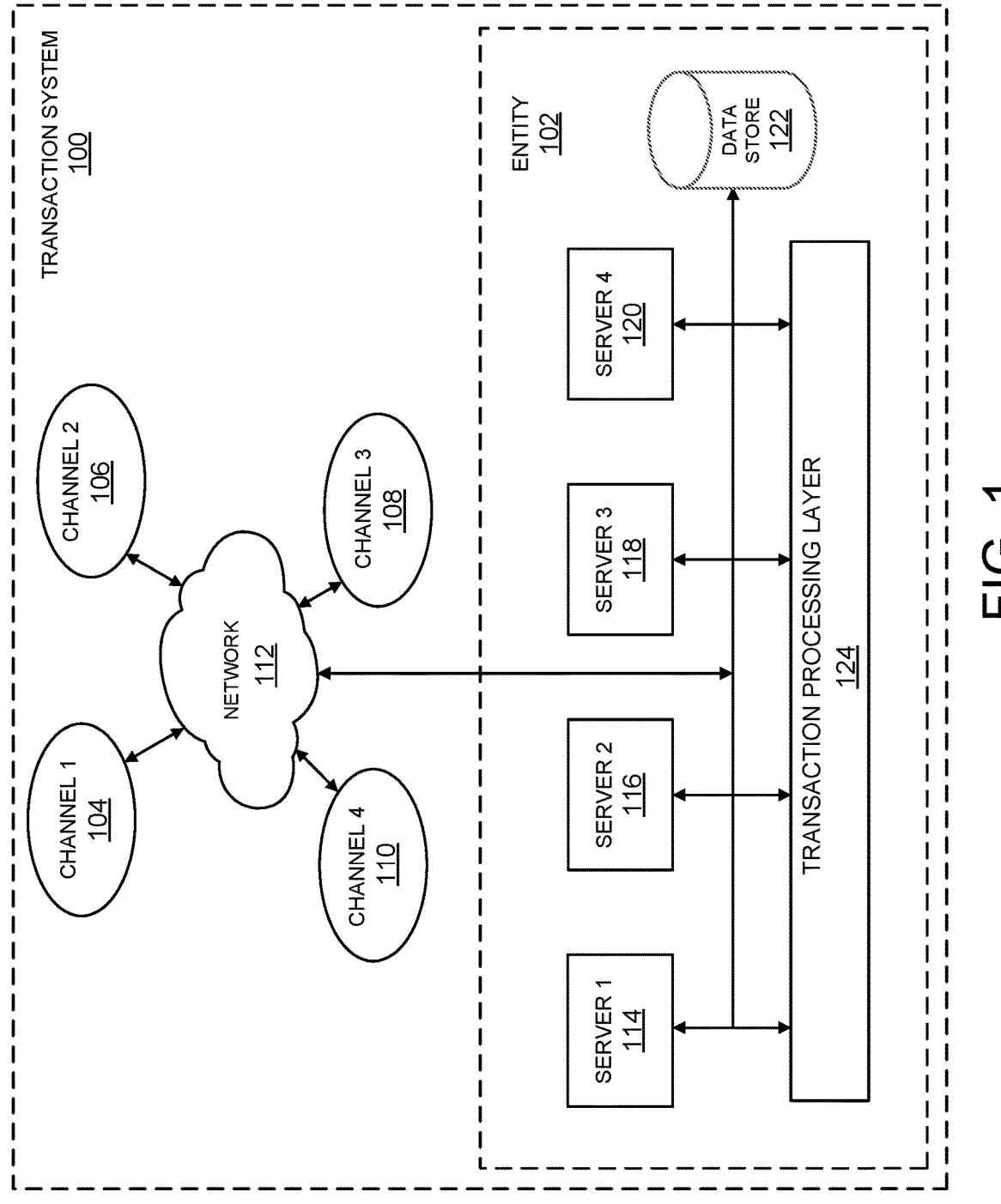
FIG. 1 is a schematic diagram representing one example of a computing environment within which electronic transactions can take place.

An electronic transaction computing environment may include a transaction system having multiple different transaction channels through which users can transmit transaction requests to an entity for processing. Transaction systems may be complex, having multiple components and applications that can reside at different locations and depend on expected operations and interactions for proper transaction processing. As a result of such complexities, and in light of the substantial number of transactions that are commonly processed by a given entity, a transaction system can experience problems such as but not limited to, component and application malfunctions, or incomplete or corrupted transaction data, associated with the various transaction channels of the system.

Aspects of the present disclosure are directed to a system for automatically notifying one or more appropriate parties to the existence of an alert generated in response to a problem associated with a transaction channel. The transaction channel associated with a given alert may be one of a plurality of transaction channels via which transactions are received and processed by a given entity.

A notification system according to the present disclosure may include multiple layers for monitoring multiple transaction channels for alerts and associated problems, and for notifying one or more appropriate parties to the existence of an alert generated in response to a problem associated with a transaction channel. For example, a transaction channel monitoring layer may be operative to monitor a plurality of transaction channels and to receive an alert generated by a server application of a server associated with a transaction channel when a problem occurs relative to the transaction channel. Additionally, a real-time notification layer can retrieve alerts received by the channel monitoring layer regarding problems associated with individual transaction channels of the plurality of transaction channels. Based on information in the alerts, such as but not limited to, an identification of the transaction channel that issued the alert, the alert type, and the alert severity, the real-time notification layer can automatically determine a type of notification that should be generated and to whom the notification should be transmitted, and can then automatically generate a proper notification and transmit the notification to an appropriate recipient(s).

Thus, a notification system of the present disclosure can automatically generate a notification associated with a given transaction channel problem, and can further transmit the notification or incident report in real-time to an appropriate recipient(s) without any required user input. This saves both time and memory resources, and the real-time nature of the notification may also help to minimize any negative consequences of a transaction channel problem.

The following illustrative examples are provided to introduce the reader to the general subject matter discussed herein, and are not intended to limit the scope of the disclosed concepts. In the following description, specific details are set forth in order to provide a thorough understanding of various implementations and examples. Various implementations may be practiced without these specific details. The figures and description are not intended to be restrictive.

FIG. 1 is a schematic diagram representing an example of a computing environment including a transaction system 100 via which users can transmit transaction requests to an entity 102 for processing. The transaction system 100 can include one or more transaction channels, with four transaction channels 104, 106, 108, 110 being present in this example. The transaction channels 104-110 can communicate with other components and layers of the transaction system 100 at the entity 102 via a network 112. The network may be without limitation, a local area network (LAN), a wide-area network (WAN) such as the Internet, an institutional network, cellular or other wireless networks, virtual networks such as an intranet or an extranet, etc.

The transaction channels 104-110 of the transaction system 100 can include, for example and without limitation, payment channels, fund transfer channels, loan servicing channels, account services channels, ATM channels, mobile device transaction channels, etc. While only four transaction channels 104-110 are shown to be part of the transaction system 100 in the example of FIG. 1, other transaction system examples may include a lesser or a greater number of transaction channels. Also, while the transaction channels 104-110 are all shown to be located remotely from the entity 102 in the example of FIG. 1, it is possible that a given transaction system may also include internal transaction channels.

Various components and layers of the transaction system 100 may be located at the entity 102. In the computing environment and transaction system example of FIG. 1, the components are shown to include a plurality of computing devices in the form of servers 114, 116, 118, 120. Each of the servers 114-120 interacts with a corresponding transaction channel 104-110, and supports the transaction processing operation.

The servers 114-120 may be various types of servers. For example, one or more of the servers 114-120 can be an application server that includes processor-executable instructions (e.g., applications/programs/software) that cause the server to perform operations that fulfill the particular needs of the transaction channel 104-110 with which the server interacts. For example, a server application of an application server can issue an alert regarding a problem relative to a transaction channel with which the server is associated. One or more of the servers can also be a web server 148 that supports a data exchange with user devices associated with a given transaction channel, such as a mobile transaction channel whereby mobile user devices communicate with the entity 102 through one or more websites over the Internet.

One or more of the servers 114-120 may be configured to perform authentication, authorization, or other verification functions associated with a user or a transaction. For this and other purposes, the transaction system 100 can also include one or more data stores 122 for storing user data, account data, transaction data, etc. In any case, by way of the servers 114-120, transactions submitted by users via the transaction channels 104-110 are received, acted upon, and transferred to a downstream transaction processing layer 124 of the transaction system 100.

Figure 2:
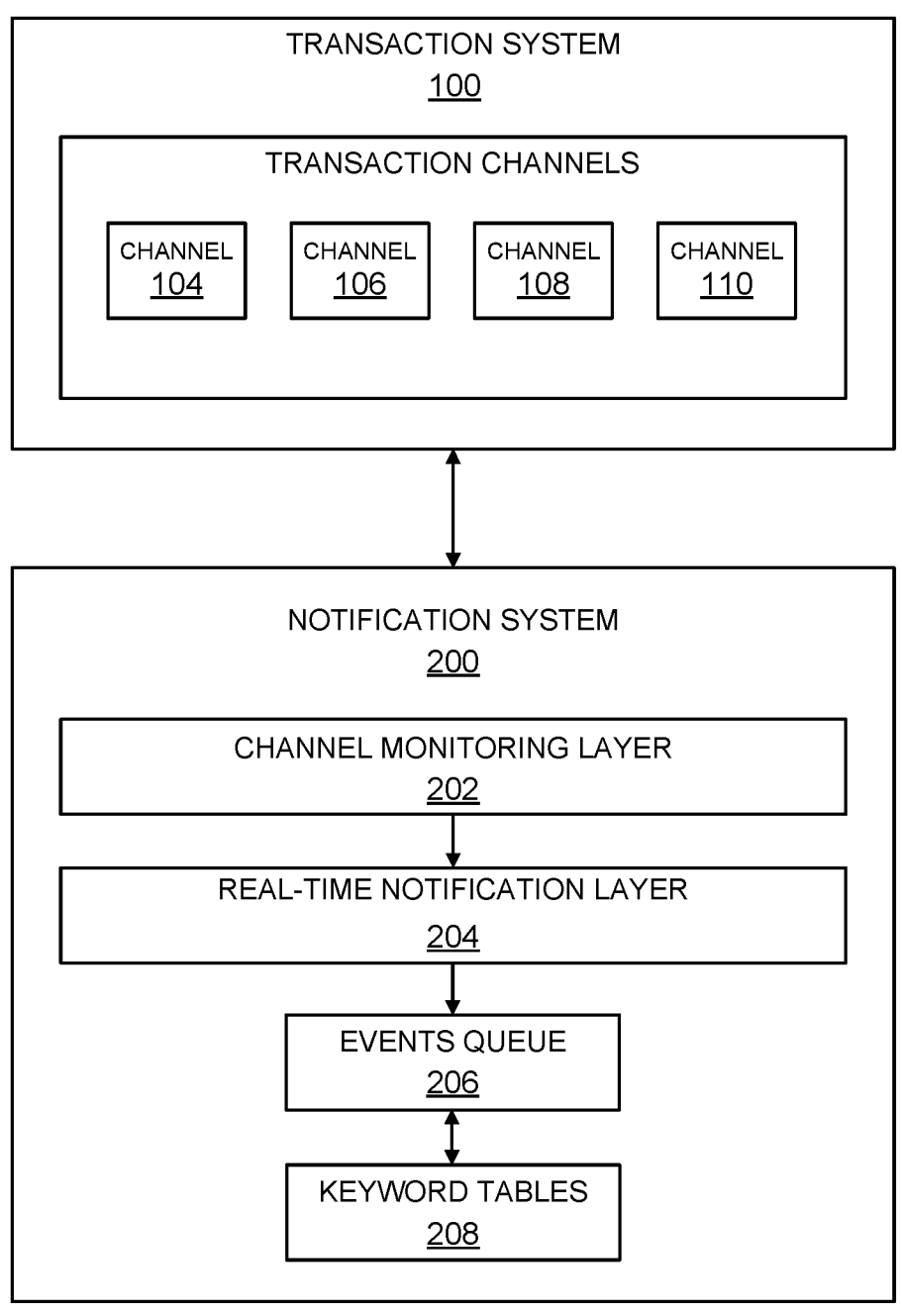
FIG. 2 is a block diagram of a system for notifying at least one recipient in real time about an alert issued by a transaction channel of a transaction system, according to an example of the present disclosure.

FIG. 2 is a block diagram representing one example of a notification system 200 for providing real-time notifications of problems associated with transaction channels of a transaction system, such as the transaction channels 104-110 of the transaction system 100. Each transaction channel of the plurality of transaction channels 104-110 of the transaction system 100 may be operative, through hard coding in the channel applications of the servers 114-120 or otherwise, to issue an alert whenever the channel experiences a problem.

A given alert issued relative to a transaction channel 104-110 according to some examples of the present disclosure can include an identification of the particular transaction channel of the plurality of transaction channels 104-110 that is associated with the detected problem. An alert issued relative to one of the plurality of transaction channels 104-110 may also indicate an alert type. For example, the alert can be categorized as a system type alert when, for example, the alert is related to a detected technical problem with a transaction system component such as a server, etc. Alternatively, the alert can be categorized as a data alert type when, for example, the alert is related to a detected problem with a transaction, such as a loss or corruption of transaction data. An issued alert may additionally indicate an alert severity.

The example of the notification system 200 represented in FIG. 2 includes a transaction channel monitoring layer 202 and a real-time notification layer 204. The notification system 200 is in communication with the transaction system 100, such as over a network (e.g., network 112) or otherwise, such that the transaction channel monitoring layer 202 can monitor the transaction channels 104-110 of the transaction system 100 and receive alerts therefrom. When communication between the notification system 200 and the transaction system 100 occurs over a network, the network may be without limitation, a local area network (LAN), a wide-area network (WAN) such as the Internet, an institutional network, cellular or other wireless networks, virtual networks such as an intranet or an extranet, etc., depending at least in part on the location of the notification system 200.

The transaction channel monitoring layer 202 of the notification system 200 is configured to monitor the transaction channels 104-110 and to receive an alert when there is a system or data problem associated with any of the transaction channels 104-110. An alert received by the transaction channel monitoring layer 202 of the notification system 200 relative to a transaction channel of the plurality of transaction channels 104-110 can be retrieved by the real-time notification layer 204 of the notification system 200. In one example of a notification system according to the present disclosure, the real-time notification layer 204 can retrieve the alert received by the transaction channel monitoring layer 202 directly from the transaction channel monitoring layer. In another example of a notification system according to the present disclosure, the real-time notification layer 204 can retrieve the alert received by the transaction channel monitoring layer 202 from an events queue 206 where the received alert can be temporarily stored by the transaction channel monitoring layer 202. In such an example, the real-time notification layer 204 of the notification system 200 can be communicatively coupled to the events queue 206, and is aware of each alert added to the events queue 206. Therefore, the real-time notification layer 204 can retrieve and act on alerts in the events queue 206 in real time.

Notification system 200 examples according to the present disclosure can use the information contained in an alert regarding a problem associated with a transaction channel of the plurality of transaction channels 104-110 to determine a form of a notification to be generated, the content of the notification, and at least one recipient of the notification.

Transaction system problems associated with the transaction channels 104-110 of the transaction system 100 may result in different consequences. For example, a minor system or data problem may require only that an appropriate party is made aware of the problem. Contrarily, a more serious data problem, or more likely a more serious system problem, may require a temporary shutdown of the transaction system 100 or at least the transaction channel of the plurality of transaction channels 104-110 that is associated with the problem. As such, the notification system 200 can consider the alert severity information in an alert issued by a transaction channel relative to determining a form of a notification to be generated in response to the alert.

In the case of an alert that indicates a minor system or data problem, the notification system 200 may determine that the form of a notification to be generated need only be a simple notice designed to make a recipient of the notification aware of the transaction channel problem that resulted in the alert.

This type of notification may indicate that some future action is required on the part of the recipient, or may simply indicate the problem and leave any decision on resulting actions up to the discretion of the recipient. Alternatively, in the case of an alert that indicates a more serious system or data problem, such as but not limited to a system or data problem that is suggestive of or requires a shutdown of the transaction system 100, the notification system 200 may determine that the form of a notification to be generated needs to be a formal incident report or another type of warning that indicates to a recipient of the notification the severity and urgency of the transaction channel problem that resulted in the alert. This type of notification may indicate a particular action that should be taken by the recipient, or again, may leave any decision on resulting actions up to the discretion of the recipient.

When determining the content of a notification to be generated and the at least one recipient of the notification, the notification system 200 can also consider the transaction channel with which the alert is associated and the alert type information in an alert issued relative to a transaction channel. For example, if the alert type is indicative of a technical problem (i.e., the alert is a system type alert), the notification system 200 may determine that a generated notification should be transmitted to at least one recipient in the form of a person or a group of persons responsible for addressing technical problems (e.g., server or middleware problems) associated with the transaction system 100. Alternatively, if the alert type is indicative of a data problem (i.e., the alert is a data type alert), the notification system 200 may determine that a generated notification should be transmitted to at least one recipient in the form of a person or a group of persons (e.g., a channel group) associated with the operations of the particular transaction channel relative to which the alert was generated.

The content of a notification to be generated can also be determined by the notification system 200 in response to the information contained in an alert issued by a transaction channel of the plurality of transaction channels 104-110. For example, the real-time notification layer 204 of the notification system 200 may be in communication with at least one keyword data table 208. The at least one keyword data table 208 may include particular information (e.g., text) that is to be included in a generated notification when one or more keywords are found in a transaction channel alert. Therefore, the real-time notification layer can map at least some of the information contained in the alert retrieved by the real-time notification layer to a list of keywords in the at least one keyword data table, and can determine the content of the notification based at least in part on the results of the mapping.

In examples of the notification system 200 according to the present disclosure, the notification system 200 may also utilize a data table relative to determining at least one recipient of a notification to be generated. For example, when determining at least one recipient of a notification to be generated, the notification system 200 may map alert type information contained in a transaction channel alert to a data table of appropriate notification recipients based on data type, and use the mapping results in determining the at least one recipient of the notification.

Once the notification system 200 has determined a form of a notification to be generated, the content of the notification, and at least one recipient of the notification, the notification system 200 can generate the notification and transmit the notification in real-time to the at least one recipient of the notification. A generated notification may be transmitted in real time to an intended recipient in any readable or translatable format using any suitable communication mechanism known to one of skill in the art. For example, a generated notification may be transmitted to the at least one recipient through a communication channel integrated into the transaction system 100, by way of another type of institutional network, via a wide-area network (WAN) such as the Internet, or a cellular or other wireless network. In one example of a notification system 200 according to the present disclosure, a generated notification is transmitted to the at least one recipient in the form of an electronic mail message.

The operations of examples of the notification system 200 are preferably configurable rather than, for example, hard coded. In this manner, a substantially generic notification system may be developed, that may thereafter be customized or otherwise configured for operation with the particular transaction channels of a particular transaction system, as well as the particular types of alerts that can be issued relative to the transaction channels. For example, and without limitation, a unique keyword data table may be provided for each transaction channel of a transaction system, such that a real-time notification layer of the notification system can produce a notification that is specific to a given transaction channel by performing a mapping of an alert issued by the given transaction channel to a keyword data table that is unique to the given transaction channel.

Figure 3:
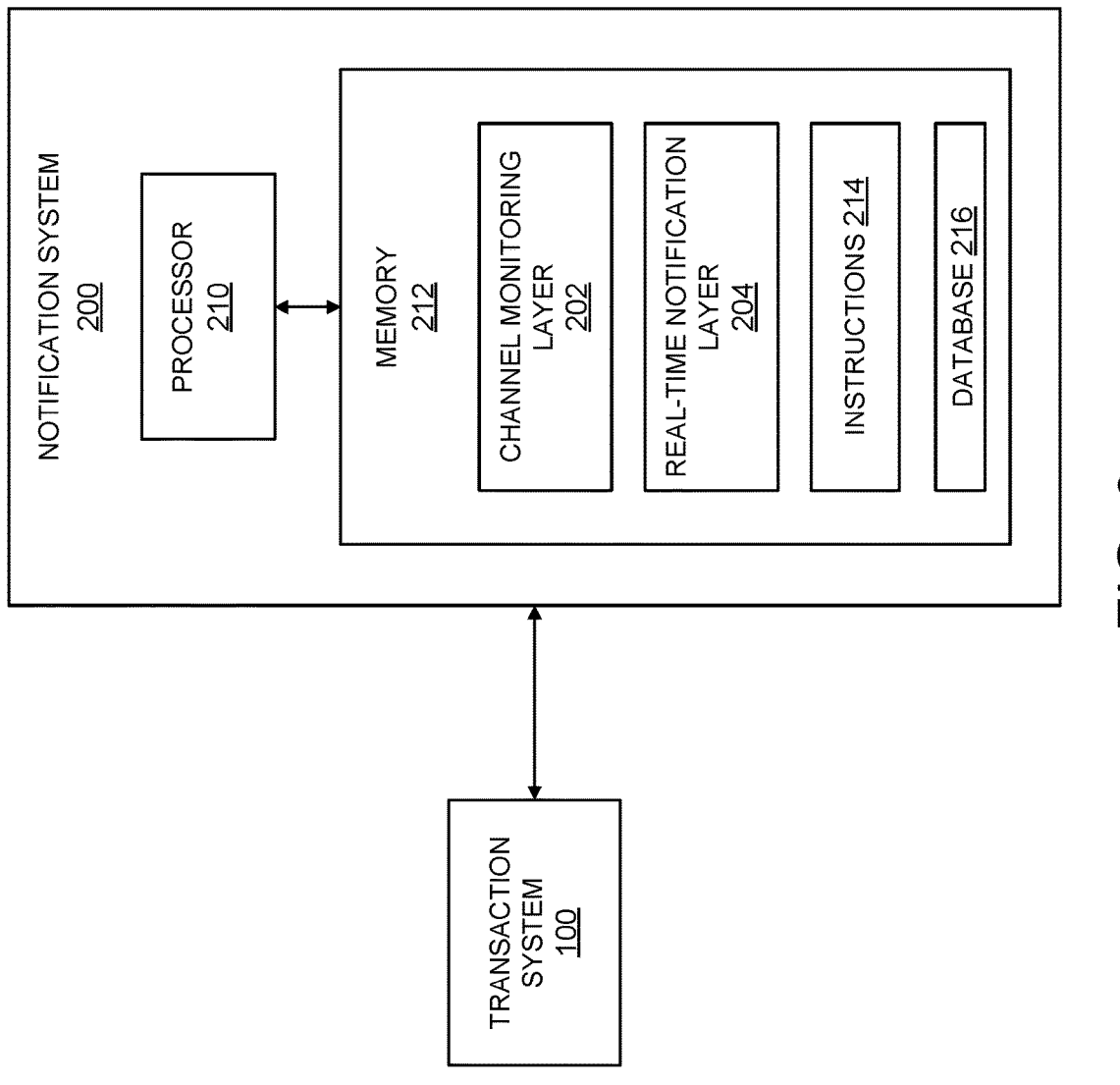
FIG. 3 is a block diagram of a system for notifying at least one recipient in real time about an alert issued by a transaction channel of a transaction system according to another example of the present disclosure.

FIG. 3 is a block diagram depicting various components of one example of a notification system according to the present disclosure, such as the notification system 200 described above with respect to the block diagram of FIG. 2. As depicted, the notification system 200 may include a processor 210 that is communicatively coupled to a memory 212. The processor 210 may also be communicatively coupled to a database 216. The database 216 may store, among other things, the at least one keyword data table 208 described above with respect to FIG. 2. In some notification system examples according to the present disclosure, a database to which the processor of the notification system is communicatively coupled may be located remotely from the processor and the system memory and may be in communication with the processor over a network.

The processor 210 can include one processing device or multiple processing devices. Non-limiting examples of the processor 210 include a Field-Programmable Gate Array (FPGA), an application-specific integrated circuit (ASIC), a microprocessor, etc. The processor 210 can execute instructions 214 stored in the memory 212 to perform operations. In some examples, the instructions 214 can include processor-specific instructions generated by a compiler or an interpreter from code written in a suitable computer-programming language, such as C, C++, C #, etc.

The memory 212 can include one memory or multiple memories. The memory 212 can be non-volatile and may include any type of memory that retains stored information when powered off. Non-limiting examples of the memory 212 include electrically erasable and programmable read-only memory (EEPROM), flash memory, or any other type of non-volatile memory. At least some of the memory 212 can be a non-transitory computer-readable medium from which the processor 210 can read the instructions 214. A computer-readable medium can include electronic, optical, magnetic, or other storage devices capable of providing the processor 210 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 210 can read the instructions 214.

FIG. 4 is a flowchart illustrating one example of a computer-implemented method of notifying at least one recipient about an alert issued relative to a transaction channel of a transaction system. At block 300 of the flowchart of FIG. 4, a transaction channel of a plurality of transaction channels initially issues an alert regarding a problem associated with the transaction channel. At block 302, the alert issued by the transaction channel is received by a transaction channel monitoring layer of a notification system in communication with the transaction system. At block 304, the alert received by the transaction channel monitoring layer of the notification system is retrieved by a real-time notification layer of the notification system. At block 306, a processor of the notification system automatically determines, from information contained in the alert retrieved by the real-time notification layer, a form of a notification to be generated, a content of the notification, and at least one recipient of the notification. The notification system then automatically generates the notification at block 308, and subsequently automatically transmits the notification in real-time to the at least one recipient of the notification at block 310.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system, comprising:
a transaction computing system comprising:
a plurality of transaction channels to receive transaction requests; and
a plurality of servers, each server of the plurality of servers communicatively coupled to a corresponding transaction channel of the plurality of transaction channels and including a server processor and a memory communicatively coupled to the server processor, the memory storing a server application including instructions that are executable by the server processor to cause the server application to:
execute transaction requests received by the transaction channel communicatively coupled to the server, and
generate a system type alert when the transaction system experiences a technical problem that affects operation of the channel or a data type alert when the transaction system experiences a problem with transaction data associated with a transaction request received by the channel, the alert including an identification of the transaction channel and indicating an alert severity; and
a configurable notification computing system communicatively coupled to the transaction computing system via a network and comprising:
a transaction channel monitoring layer communicatively coupled to the plurality of transaction channels of the transaction computing system;
a real-time notification layer; and
a processor communicatively coupled to a database and a memory communicatively coupled to the processor, the memory including instructions that are executable by the processor to cause the processor to:

simultaneously monitor, by the transaction monitoring layer, the plurality of transaction channels of the transaction computing system, receive, by the transaction channel monitoring layer, in real time from at least some of the server applications of the servers of the transaction computing system, a plurality of alerts generated by the at least some of the server applications, determine, based on at least the alert severity of a given alert of the plurality of alerts, a need to shut down the transaction computing system, generate, by the real-time notification layer, a unique notification for the given alert, wherein:

a form of the notification is based on the alert severity, at least one recipient of the notification is determined, based at least in part, on the alert type and the transaction channel that issued the alert, and a content of the notification includes at least some of various possible predetermined information that is selected by mapping one or more keywords present in the alert to one or more keywords in a unique keyword data table that includes a list of keywords and corresponds to the transaction channel that issued the alert, and the predetermined information instructs a shutdown of the transaction computing system, transmit, through a communication channel integrated into the transaction computing system, the notification in real-time to the at least one recipient of the notification; and in response to determining the need to shut down the transaction computing system based on at least the alert severity of the given alert, shut down the transaction computing system.

2. The system of claim 1, wherein the at least one recipient of the notification is also determinable, at least in part, by mapping the alert type information contained in the given alert to a data table of appropriate notification recipients based on the alert type.

3. The system of claim 1, wherein each server application includes processor-executable instructions that cause the server application to perform operations specific to a need of the transaction channel served by the server application.

4. The system of claim 1, wherein each unique keyword data table includes a configurable list of keywords that are descriptive of different possible data or system problems of the transaction channel to which the keyword data table corresponds.

5. The system of claim 1, wherein the list of keywords in each of the unique keyword data tables is mapped to information to be included in the content of the notification.

6. The system of claim 1, wherein the memory of the configurable notification computing system includes instructions that are executable by the processor of the configurable notification computing system to cause the configurable notification computing system to:

temporarily store the plurality of alerts in an events queue; and retrieve, by the real-time notification layer, the plurality of alerts from the events queue.

7. The system of claim 1, wherein the memory includes instructions that are executable by the processor to cause the transaction system to transmit the notification as an electronic mail message.

8. A first non-transitory computer-readable medium comprising instructions that are executable by a server processor of a server of a plurality of servers of a transaction computing system, where each server of the plurality of servers is communicatively coupled to a corresponding transaction channel of a plurality of transaction channels, and where the instructions are configured for causing the server processor to:

execute, by a server application of the server, transaction requests received by the transaction channel communicatively coupled to the server; and generate, by the server application, a system type alert when the transaction system experiences a technical problem that affects operation of the channel or a data type alert when the transaction system experiences a problem with transaction data associated with a transaction request received by the channel, the alert including an identification of the transaction channel and indicating an alert severity; and a second non-transitory computer-readable medium comprising instructions that are executable by a processor of a configurable notification computing system communicatively coupled to the transaction computing system via a network and comprising a transaction channel monitoring layer communicatively coupled to the plurality of transaction channels of the transaction computing system, an events queue communicatively coupled to the transaction channel monitoring layer, and a real-time notification layer communicatively coupled to the events queue, the instructions configured for causing the processor to:

simultaneously monitor, by the transaction monitoring layer, the plurality of transaction channels of the transaction system;

receive, by the transaction channel monitoring layer, in real time, a plurality of alerts issued by at least some of the server applications of the servers of the transaction computing system;

determine, based on at least the alert severity of a given alert of the plurality of alerts, a need to shut down the transaction computing system, generate, by the real-time notification layer, a unique notification for the given alert, wherein:

the form of the notification is based on the alert severity, at least one recipient of the notification is determined, based at least in part, on the alert type and the transaction channel that issued the alert, and content of the notification includes at least some of various possible predetermined text that is selected by mapping one or more keywords present in the alert to one or more keywords in a unique keyword data table that includes a list of keywords and corresponds to the transaction channel that issued the alert, and the predetermined information instructs a shutdown of the transaction computing system, transmit, through a communication channel integrated into the transaction computing system, the notification in real-time to the at least one recipient of the notification; and in response to determining the need to shut down the transaction computing system based on at least the alert severity of the given alert, shut down the transaction computing system.

9. The non-transitory computer-readable medium of claim 8, wherein the at least one recipient of the notification is also determinable, at least in part, by mapping the alert type information contained in the given alert to a data table of appropriate notification recipients based on the alert type.

10. The non-transitory computer-readable medium of claim 9, wherein each server application includes processor-executable instructions that cause the server application to perform operations specific to a need of the transaction channel served by the server application.

11. The non-transitory computer-readable medium of claim 8, wherein the list of keywords in each of the unique keyword data tables is mapped to information to be included in the content of the notification.

12. The non-transitory computer-readable medium of claim 8, wherein each unique keyword data table includes a configurable list of keywords that are descriptive of different possible data or system problems of the transaction channel to which the keyword data table corresponds.

13. The non-transitory computer-readable medium of claim 8, wherein the instructions of the non-transitory computer-readable medium are executable by the processor for causing the transaction system to transmit the notification as an electronic mail message.

14. A computer-implemented method comprising:

at a transaction computing system comprising a plurality of transaction channels that receive transaction requests, and a plurality of servers, where each server of the plurality of servers is communicatively coupled to a corresponding transaction channel of the plurality of transaction channels and includes a server processor and a memory communicatively coupled to the server processor, the memory storing a server application including instructions that are executable by the server processor:

executing, by the server application, transaction requests received by the transaction channel communicatively coupled to the server; and generating, by the server application, a system type alert when the transaction system experiences a technical problem that affects operation of the channel or a data type alert when the transaction system experiences a problem with transaction data associated with a transaction request received by the channel, the alert including an identification of the transaction channel and indicating an alert severity; and at a configurable notification computing system communicatively coupled to the transaction computing system via a network and comprising a transaction channel monitoring layer communicatively coupled to the plurality of transaction channels of the transaction computing system, an events queue communicatively coupled to the transaction channel monitoring layer, a real-time notification layer communicatively coupled to the events queue, a processor communicatively coupled to a database, and a memory communicatively coupled to the processor and including instructions that are executable by the processor:

simultaneously monitoring, by the transaction monitoring layer, the plurality of transaction channels of the transaction system, receiving, by the transaction channel monitoring layer, in real time from at least some of the server applications of the servers of the transaction computing system, a plurality of alerts generated by the at least some of the server applications, determining, based on at least the alert severity of a given alert of the plurality of alerts, a need to shut down the transaction computing system, generating, by the real-time notification layer, a unique notification for the given alert, wherein:

a form of the notification is based on the alert severity, at least one recipient of the notification is determined, based at least in part, on the alert type and the transaction channel that issued the alert, and a content of the notification includes at least some of various possible predetermined information that is selected by mapping one or more keywords present in the alert to one or more keywords in a unique keyword data table that includes a list of keywords and corresponds to the transaction channel that issued the alert, and the predetermined information instructs a shutdown of the transaction computing system;

transmitting the notification in real time over the network and through a communication channel integrated into the transaction computing system, to the at least one recipient of the notification; and shutting down the transaction computing system in response to determining the need to shut down the transaction computing system based on at least the alert severity of the given alert.

15. The computer-implemented method of claim 14, wherein the at least one recipient of the notification is also determined, at least in part, by mapping the alert type information contained in the given alert to a data table of appropriate notification recipients based on the alert type.

16. The computer-implemented method of claim 14, wherein each server application performs operations specific to a need of the transaction channel served by the server application.

17. The computer-implemented method of claim 14, wherein each unique keyword data table includes a configurable list of keywords that are descriptive of different possible data or system problems of the transaction channel to which the keyword data table corresponds.

18. The computer-implemented method of claim 14, wherein the list of keywords in each of the unique keyword data tables is mapped to information to be included in the content of the notification.

19. The computer-implemented method of claim 14, further comprising temporarily storing the plurality of alerts in an events queue of the configurable notification computing system and subsequently retrieving the plurality of alerts from the events queue by the real-time notification layer of the configurable notification computing system.

20. The computer-implemented method of claim 14, wherein the notification is transmitted by the transaction system to the at least one recipient as an electronic mail message.

* * * * *